United States Patent
Ray et al.

(10) Patent No.: US 9,207,422 B2
(45) Date of Patent: Dec. 8, 2015

(54) HOLDERS FOR OPTICAL FIBER SPLICE SLEEVES AND PASSIVE OPTICAL COMPONENTS

(71) Applicant: All Systems Broadband, Inc., Livermore, CA (US)

(72) Inventors: Craig Dwayne Ray, Fuquay-Varina, NC (US); Timothy W. Dexter, Raleigh, NC (US)

(73) Assignee: All Systems Broadband, Inc., Livermore, CA (US)

( * ) Notice: Subject to any disclaimer, the term of this patent is extended or adjusted under 35 U.S.C. 154(b) by 255 days.

(21) Appl. No.: 13/649,444

(22) Filed: Oct. 11, 2012

(65) Prior Publication Data

US 2013/0108225 A1 May 2, 2013

Related U.S. Application Data

(63) Continuation-in-part of application No. 13/281,637, filed on Oct. 26, 2011, now Pat. No. 8,559,784.

(51) Int. Cl.
*G02B 6/255* (2006.01)
*G02B 6/44* (2006.01)

(52) U.S. Cl.
CPC .................................. *G02B 6/4454* (2013.01)

(58) Field of Classification Search
CPC ..................................................... G02B 6/4454
USPC ................................................. 385/134–137
See application file for complete search history.

(56) References Cited

U.S. PATENT DOCUMENTS

| | | | | |
|---|---|---|---|---|
| 5,515,472 A | * | 5/1996 | Mullaney et al. | 385/135 |
| 5,530,786 A | * | 6/1996 | Radliff et al. | 385/136 |
| 5,590,234 A | * | 12/1996 | Pulido | 385/135 |
| 5,805,758 A | * | 9/1998 | Kim | 385/137 |
| 6,249,636 B1 | * | 6/2001 | Daoud | 385/137 |
| 6,259,851 B1 | * | 7/2001 | Daoud | 385/135 |
| 6,567,601 B2 | * | 5/2003 | Daoud et al. | 385/135 |
| 6,801,704 B1 | * | 10/2004 | Daoud et al. | 385/136 |
| 7,684,669 B2 | * | 3/2010 | Bayazit et al. | 385/135 |
| 7,764,858 B2 | * | 7/2010 | Bayazit et al. | 385/135 |
| 8,559,784 B2 | * | 10/2013 | Ray et al. | 385/135 |
| 8,824,850 B2 | * | 9/2014 | Garcia et al. | 385/135 |

* cited by examiner

*Primary Examiner* — Daniel Petkovsek
(74) *Attorney, Agent, or Firm* — Murphy, Bilak & Homiller, PLLC (57) ABSTRACT

A modular assembly for supporting fiber optic splices includes a tray, cradle, and splice holder. A splice holder is mounted to the first face of the cradle base and defines a plurality of fiber optic splice slots positioned over the depression. The splice holder has parallel upright members extending from a splice holder base to define the slots between the members. The members have internal sidewalls incorporating at least one pair of grooves defining passages in which fiber splices fit. The passages have a tapered shape to accommodate varying sizes of fiber splices, and the holder utilizes alternating orientations for the passages to flexibly fit fiber splices therein. The members define an internal cavity with thinned end walls and a bubble formation at a face of the member that add to the flexibility of the members.

18 Claims, 11 Drawing Sheets

HOLDERS FOR OPTICAL FIBER SPLICE SLEEVES AND PASSIVE OPTICAL COMPONENTS

CROSS-REFERENCE TO RELATED APPLICATIONS

This application is a continuation-in-part of U.S. patent application Ser. No. 13/281,637 filed on 26 Oct. 2011, which is incorporated by reference in its entirety herein.

TECHNICAL FIELD

This application relates to the field of holders for retaining optical fiber splices that connect individual optical fibers.

BACKGROUND

Today's communication networks provide information transport of voice, video and data to both residential and commercial customers with more and more of those customers being connected by fiber optic cables. Current network designs differ among carriers, or service providers, and are influenced by such variables as legacy equipment and architectures, past and present infrastructure investments and network types. These network types include the Gigabit Passive Optical Network (GPON), the Ethernet Passive Optical Network (EPON) and the Hybrid Fiber-Coaxial (HFC) networks, to name just a few.

A fiber optic cable (or "fiber bundle") includes a number of individual optical fibers, each of which may be used to transmit significant quantities of information. Some fiber optic network designs include the use of passive components such as optical splitters and wavelength-division multiplexing (WDM) filters as a way of creating and deploying a more cost effective and efficient access network.

Individual fibers within a larger fiber bundle are generally coated, but are very thin, and are susceptible to damage if mishandled, or if bent beyond a permissible bend radius. In the past, splicing tray designs have accounted for the mounting of splice protection sleeves and for the permissible bend radius of individual fibers, but have nonetheless failed to consider passive component integration to the tray or to prevent damage to fibers in certain configurations.

Certain fiber optic applications also require different sizes of optical fibers and optical fibers splices to be handled within a fiber optic tray. These applications require fiber optic splice holders that accommodate more than one diameter for the fibers and fiber splices inserted therein.

SUMMARY

In one embodiment, a splice holder supports fiber optic splices within slots defined by a plurality of parallel spaced apart members extending from a splice holder base. Each member includes on at least one side a first concave groove proximate to the splice holder base and a second concave groove spaced away from the splice holder base, the concave grooves being separated by a ridge that is axially aligned with the grooves. Each of the plurality of slots includes a first passage defined by opposing first concave grooves and a second passage defined by opposing second concave grooves, wherein each of said passages is sized to receive a fiber optic splice.

In a different embodiment, a splice holder supports fiber optic splices within slots defined by a plurality of parallel spaced apart members extending from a splice holder base. Each member includes on at least one side a first concave groove proximate to the splice holder base, so that each of the plurality of slots includes a first passage defined by opposing first concave grooves, the passage being sized to receive a fiber optic splice. Each of the plurality of the members of the splice holder also includes an internal cavity adjacent the first concave groove and extending longitudinally through at least a majority of the member.

In yet another embodiment, a splice holder retains fiber optic splices within slots defined by a plurality of parallel spaced apart members extending from a splice holder base. The members define at least a first concave groove on at least one side of each member, wherein opposing first concave grooves define a first passage within a slot, the passage being sized to receive a fiber optic splice therein. The passage defines an entry dimension for one end of the first passage and an exit dimension for an opposite end of the first passage. The entry and exit dimensions are different such that the first passage tapers in width from a first face of the splice holder to a second face of the splice holder. Each of the plurality of the members of the splice holder also includes an internal cavity adjacent the first concave groove and extending longitudinally between respective end walls of the members.

Of course, the present invention is not limited to the above features. Indeed, those skilled in the art will recognize additional features and advantages upon reading the following detailed description, and upon viewing the accompanying drawings.

DETAILED DESCRIPTION

FIGS. 1a-b and 2a-c illustrate a modular assembly 20 for supporting fiber optic splices and other passive optical components. The modular assembly 20 includes a tray 22, a cradle 42, and a plurality of splice holders 68. The tray 22 receives fiber bundles and facilitates winding of individual fibers of those bundles within channels inside the tray 22. The cradle 42 and splice holders 68 within the tray 22 support fiber optic splices that join fibers together. As will be described in greater detail below, the assembly 20 includes a variety of features to safely and efficiently store fibers while preventing damage to those fibers.

Figure 1A:
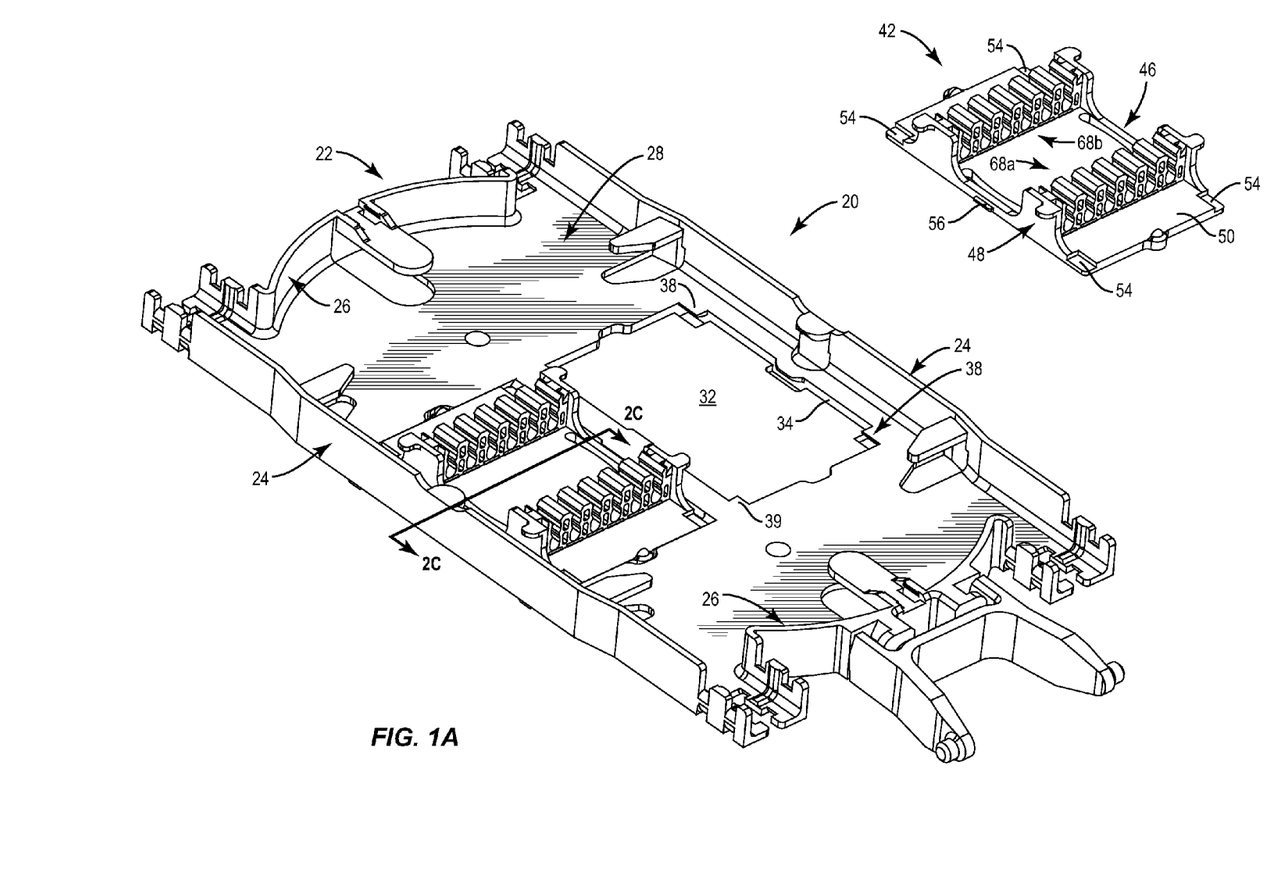
FIGS. 1a and 1b illustrate an example modular assembly for supporting fiber optic splices.
Figure 1B:
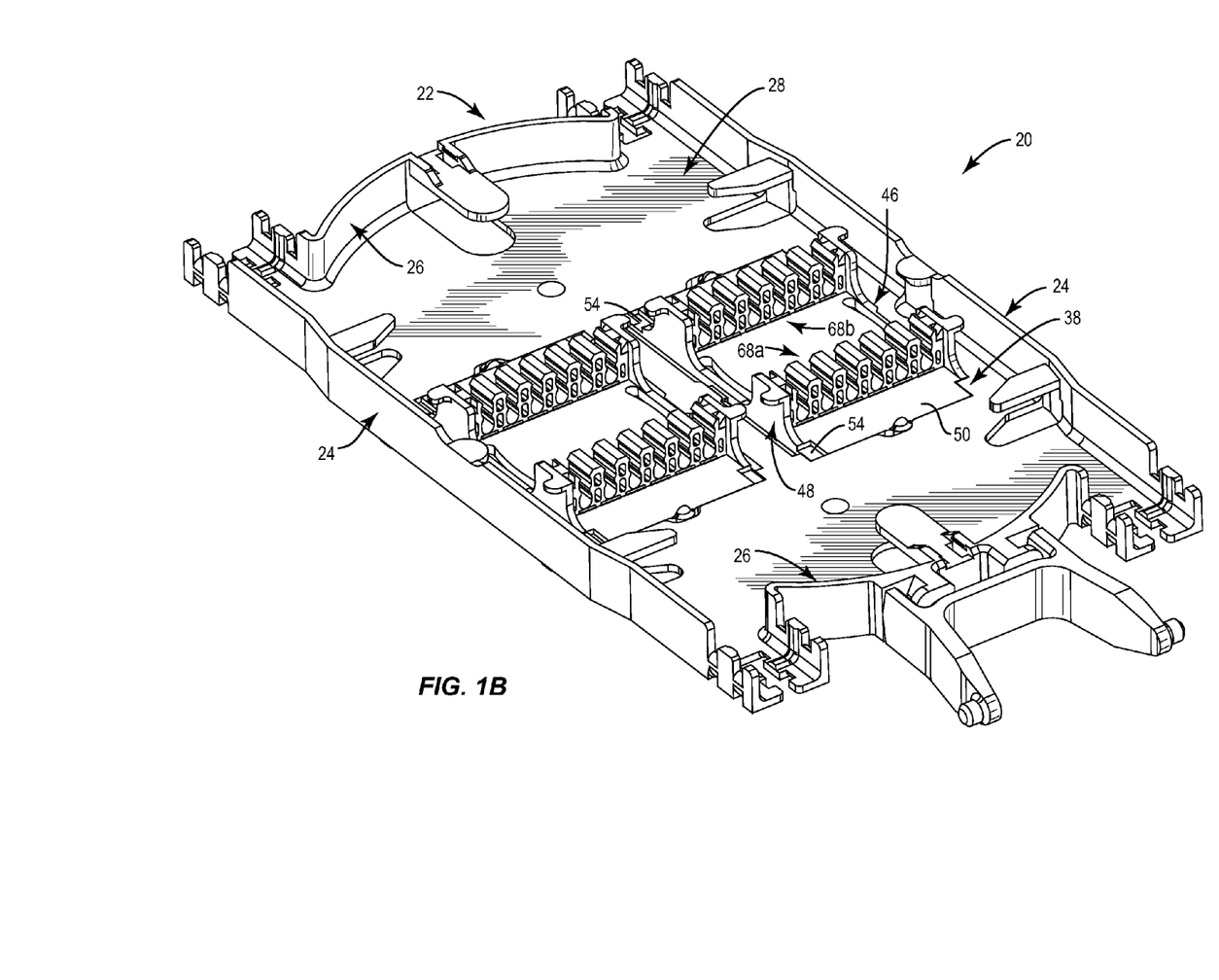

The tray 22 includes a floor 28, sidewalls 24, 26 that extend upward from the floor, and a depression 32 having its own sidewalls 34 that extend downward from an upper surface 30 of the floor 28 to a bottom 36 of the depression 32. At least one tab 38 that is spaced away from the bottom 36 of the depression 32 extends outward from one of the depression sidewalls 34 and into the depression 32. Optionally, at least one additional, smaller tab 39 may extend into the depression from an opposite side of the depression as the at least one tab 38.

Figure 2A:
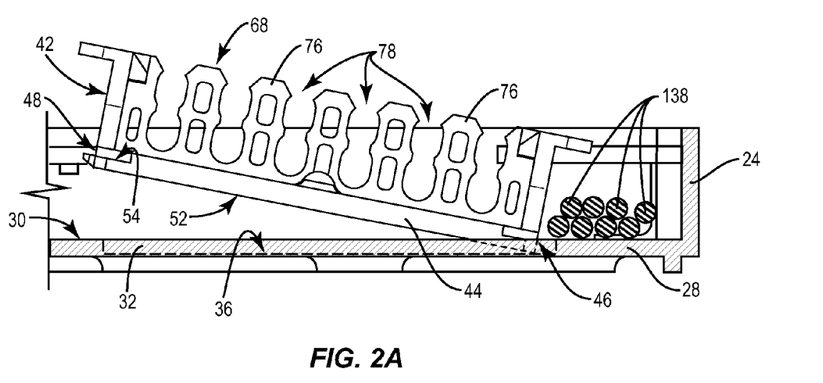
FIGS. 2a, 2b, and 2c illustrate the insertion of a cradle into a tray of the modular assembly.
Figure 2B:
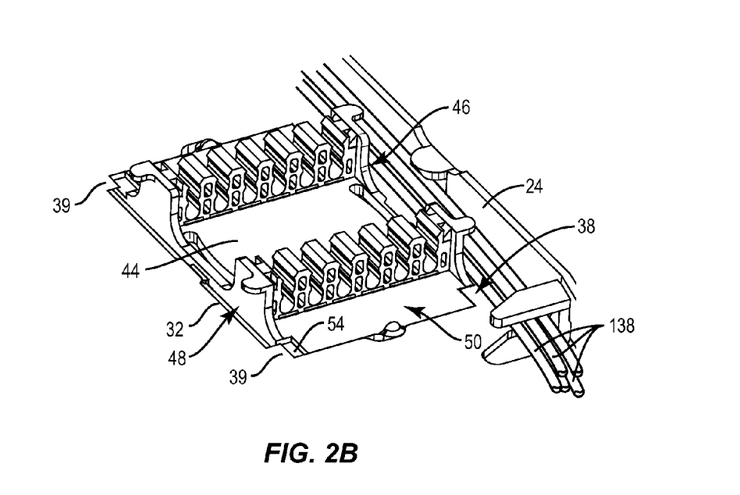
Figure 2C:
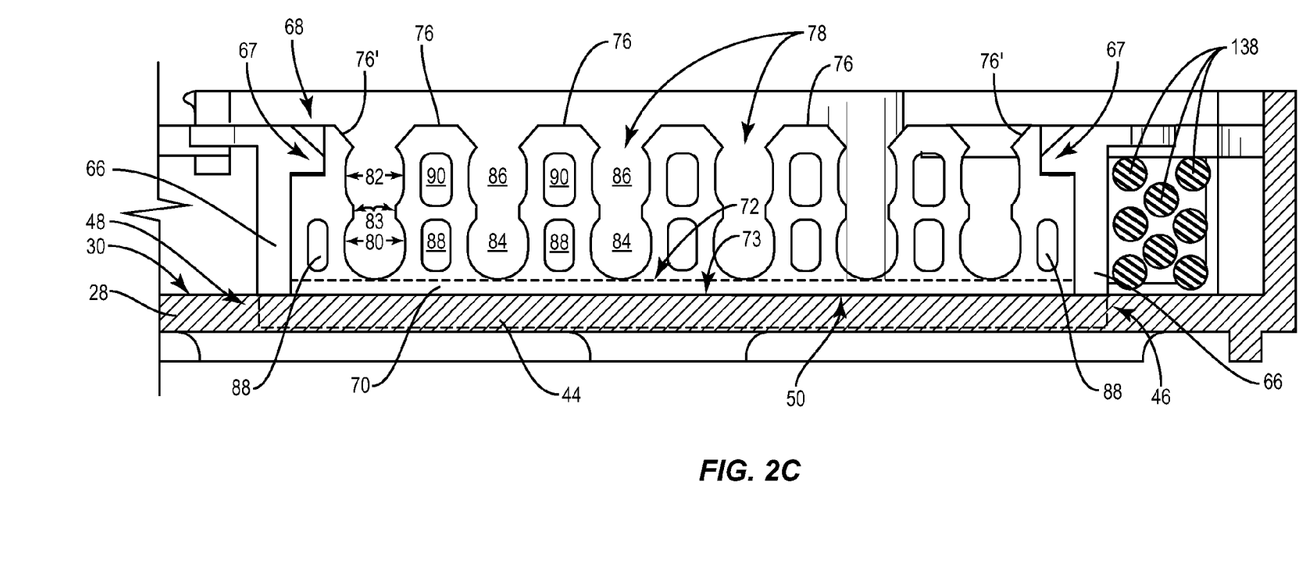

Referring to FIGS. 2a-c, the cradle 42 includes a base 44 configured to mount in the depression 32. An area of the cradle base 44 is smaller than or equal to an area of the depression 32 to enable the cradle base 44 to mount in the depression 32. The cradle base 44 has first and second opposing sides 46, 48 and also has a first face 50 positioned away from the bottom 36 of the depression 32 and an opposite second face 52 positioned towards the bottom 36 of the depression 32 when the cradle 42 is mounted in the depression 32.

The cradle base 42 includes at least one shelf 54 recessed into the first face 50 and positioned at least on the first side 46 of the cradle base 44, with the shelf 54 being positioned between the bottom 36 of the depression 32 and the tab 38 when the cradle base 42 is mounted in the depression 32. As shown in FIG. 1, the cradle base 44 may include the shelf 54 not only on both corners of the first side 46, but on both sides 46, 48 of the cradle base 44 at all four corners of the cradle base 44, with all four of the shelves 54 being positioned in the same depression 32.

When the cradle base 44 is mounted in the depression 32, the second face 52 of the cradle base 44 is flat and is parallel with the bottom 36 of the depression 32, and the first face 50 of the cradle base 44 is flush with or recessed below the upper surface 30 of the floor 28. In one or more embodiments, the cradle base 44 and the depression 32 are rectangular (see, e.g. FIGS. 1a-b). Also, in one or more embodiments, the first face 50 and the second face 52 of the cradle base 44 are parallel to each other, and are perpendicular to the sidewalls 24 of the tray 22.

Referring again to FIGS. 2a-c, by sliding the first side 46 of the cradle base 44 along the bottom 36 of the depression 32 to place the shelf 54 beneath the tab 38, fibers 138 can be safely moved away from the depression 32. This can advantageously avoid a situation that may otherwise be encountered if the shelf 54 and tab 38 were omitted, and both sides 46, 48 of the cradle base 44 would be simultaneously pressed into the depression 32, which could damage fibers 138 extending over the depression 32.

Figure 3:
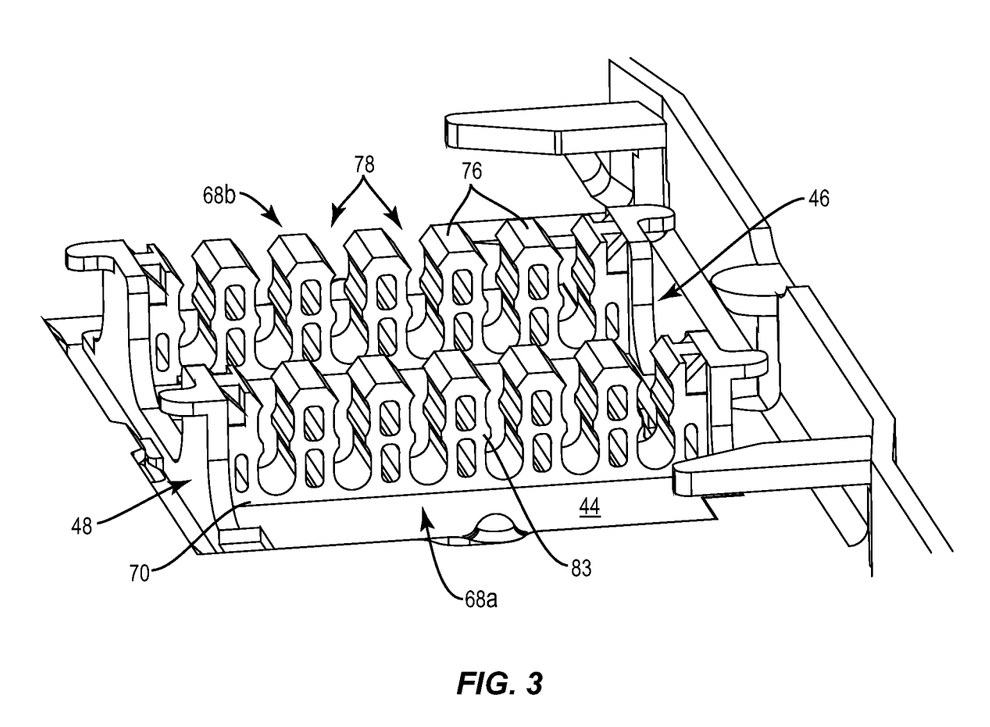
FIG. 3 illustrates an enlarged perspective view of two splice holders mounted to the cradle.

Referring to FIG. 2c and FIG. 3, at least one splice holder 68 is mounted to the first face 50 of the cradle base 44 and defines a plurality of slots 78. Each of the slots 78 is sized to receive fiber optic splices 140 connecting individual fibers 138 (see FIG. 10), and each of the slots 78 is positioned over the depression 32 when the cradle base 44 is mounted in the depression 32. The splice holder 68 includes a splice holder base 70 having a first face 72, and an opposite second face 73, with the first face 72 being positioned away from the first face 50 of the cradle base 44, and the second face 73 being positioned towards the first face 50 of the cradle base 44 (see FIG. 3). Each of a plurality of parallel spaced apart members 76 extends from the first face 72 of the splice holder 68 to define the plurality of slots 78 there between.

Each member 76 includes on at least one side a first concave groove 80 proximate to the splice holder base 70, and a second concave groove 82 spaced away from the splice holder base 70. The concave grooves 80, 82 are separated by a ridge 83 that is axially aligned with the grooves 80, 82.

Each of the plurality of slots 78 includes a first passage 84 defined by opposing first concave grooves 80, and a second passage 86 defined by opposing second concave grooves 82. Each of the passages 84, 86 is sized to receive a fiber optic splice 140, such that fiber optic splices 140 may be stacked within the slots 78 (e.g. one splice 140 in each passage 84, 86). Note that while the splice holders 68 illustrated in FIGS. 1a-b and 2a-2c and discussed more generally herein are designed to receive and secure optical fiber splice sleeves, they are not limited to that purpose. Indeed, splice holders 68 can be used to secure other passive optical components, such as optical filters, couplers, dividers, etc., provided only that the optical component is generally tubular, with cross-sectional diameters that are roughly comparable to those for optical fiber splice sleeves. It should also be appreciated that the cross-section of these passive components need not be circular or even roughly circular, due to the compliant nature of the splice holders.

In the embodiment shown in FIG. 2C, a plurality of the members 76 of the splice holder 68 also include a first relief passage 88 adjacent to the first concave groove 80 on the at least one side of the member 76, and a second relief passage 90 adjacent to the second concave groove 86 on the at least one side of the member 76. As shown in FIG. 2c, this plurality includes all but the outermost members 76', which still include the first relief passage 88, but omit the second relief passage 90. Each of the relief passages 88, 90 are axially aligned with the grooves 80, 82. Also, each of the relief passages 88, 90 permit expansion of their adjacent first passage 84 or second passage 86 via lateral deformation of their respective adjacent first concave groove 80 or second concave groove 82, to improve retention of the splices 140 while minimizing movement of the members 76. Therefore, variations in splice sizes and cross-sectional shapes are permitted, as various sizes of splices can be secured in the slots 78 while minimizing the effect that movement of the members 76 from oversized splices would otherwise have on splices 140 stored in neighboring slots 78. Indeed, the deformation of the relief passages allows the splice holder to be used to receive and secure other passive optical components having similar cross-sectional dimensions to splice sleeves, including components that have rectangular or other non-circular cross-sections. Although the splice holder of 68 of FIG. 2c is illustrated as having six slots 78 for a total of twelve passages 84, 86, it is understood that this is only an example, and that other quantities of slots 78 and passages 84, 86 could be included in the splice holder 68.

FIG. 3 provides an enlarged perspective view of two splice holders 68a-b mounted to the cradle base 44. As shown in FIG. 3, the splice holders 68a-b define first and second columns of slots 78 that are horizontally spaced apart between the first and second sides of the cradle base 46, 48 and that are arranged in a parallel configuration so that the slots 78 of the first column (splice holder 68a) vertically align with the slots 78 of the second column (splice holder 68b) above the cradle base 44. In this configuration, a single fiber splice 140 may extend between the splice holders 68a-b to be supported by an aligned slot 78 in each of the holders 68a-b.

Each splice holder 68 is secured to the cradle base 44 via a snap-in feature provided by arms 66 that extend upwards from the first face 50 of the cradle base 44 at the first side 46 and second side 48 of the cradle base 44. In the illustrated embodiment, each arm 66 includes a cradle tab 67, with the tabs 67 extending towards each other over the cradle base 44

(see FIG. 2c). Each splice holder 68 is positioned between the 66 arms so that each cradle tab 67 extends into an opposite side of the splice holder 68 to mount the splice holder 68 to the first face 50 of the cradle base 44. As shown in FIGS. 1 and 3, the cradle 42 may include four arms 66 and four corresponding cradle tabs 67 to mount the separate splice holders 68a-b to the cradle base 44.

FIGS. 4-10 illustrate another embodiment of a fiber optic splice holder 100 that accommodates multiple fiber optic splices 140 with varying diameters, and/or other optical passive components such as couplers, filters, power dividers, etc. This embodiment of the fiber optic splice holder includes two rows of passages 114, 116 and, as noted in the prior embodiment, each of the passages 114, 116 is sized to receive a fiber optic splice 140. The splice holder 100 includes a splice holder base 102 from which parallel members 105 extend to define a plurality of slots 108 between the members 105. Each member 105 includes on at least one side a first concave groove 110 proximate to the splice holder base and a second concave groove 112 spaced away from the splice holder base. The concave grooves 112, 114 are separated by a ridge 104. Opposing pairs of concave grooves on adjacent members define the passages 114, 116. In this way, each of the slots 108 between members 105 include a first passage 114, defined by opposing first concave grooves 110 and a second passage 116 defined by opposing second concave grooves 112. Each of said passages are sized to receive a fiber optic splice 140. The passages 114, 116 are positioned vertically adjacent each other such that the first passage 114 is between the base 102 and the second passage 116. The splice holder, therefore, receives fiber optic splices 140 or other optical components that may be stacked within the slots 108 (e.g., one splice 140 in each passage 114, 116).

Figure 4:
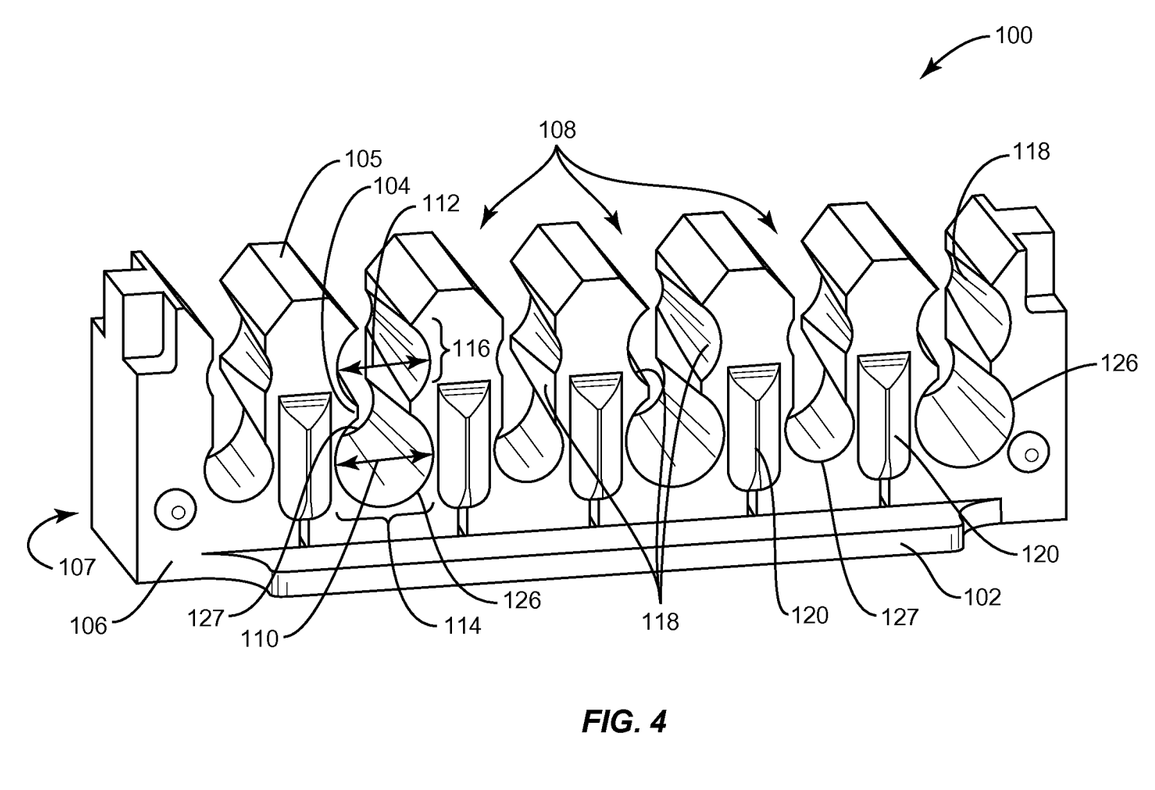
FIG. 4 illustrates a front perspective view of a fiber optic splice holder as disclosed herein.

The splice holder 100 accommodates a range of different sizes of fiber splices. The splice holder 100 incorporates opposing pairs of concave grooves 110, 112 having different dimensions at exterior faces 106, 107 of the splice holder 100. Accordingly, pairs of concave grooves 110, 112 define regions within the slots 108 (i.e., portions of passages 114, 116) that are dimensioned to secure a cross section of a fiber splice within the splice holder. The splice holder 100 includes regions that engage and secure fiber splices of diverse cross sections in a single fiber holder. FIG. 4 illustrates a fiber splice holder for securing fiber splices having a circular or roughly circular cross section, but the fiber splice holder 100 disclosed herein is not limited to any one shape for the fiber splices or other optical components. The use of cylindrical or circular shapes for the passages 114, 116 is for the purpose of example only.

Figure 5A:
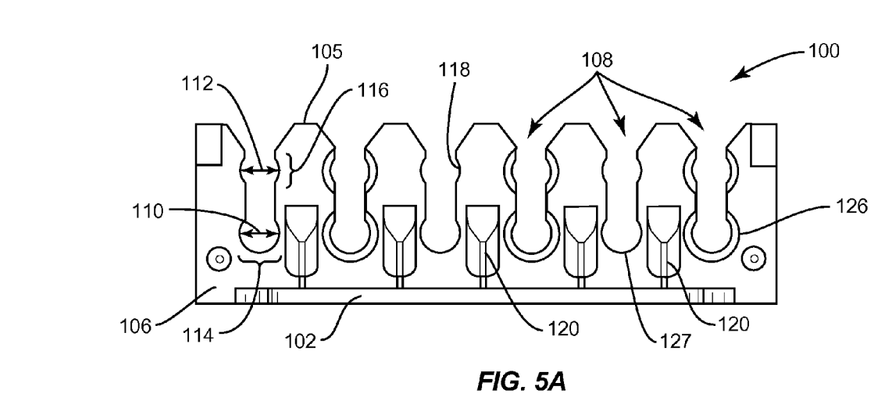
FIGS. 5a and 5b illustrate respective front and back elevation views of a fiber optic splice holder as disclosed herein.
Figure 5B:
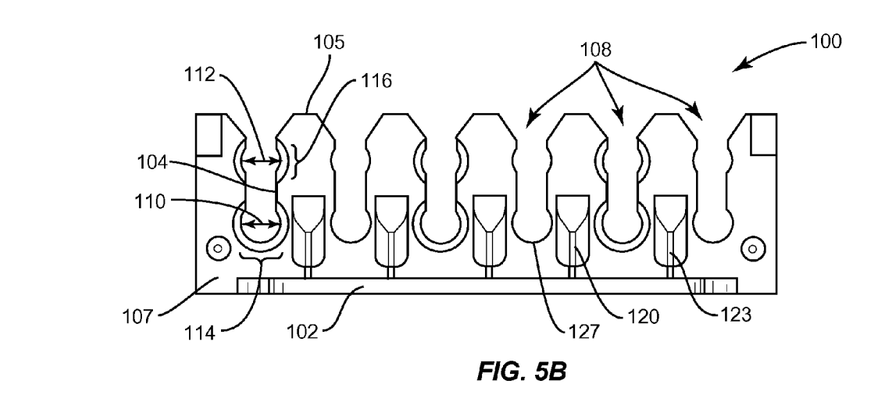

FIGS. 4, 5a, and 5b illustrate that the passages 114, 116 extend through the splice holder 100 between adjacent members 105 and taper in width between first and second exterior faces 106, 107 of the fiber splice holder 100. The tapered width of each passage 114, 116 results in the passages each defining a conical shape between the members 105. In other words, the passages 114, 116 each define an entry and an exit for a fiber splice 140 held within the splice holder 100. One face 106 of the splice holder 100 accommodates entry of a fiber splice between opposing concave grooves 110, 112 and defines an entry dimension 126 for one end of the first passage 114. An opposite exterior face 107 of the fiber splice holder 100 defines an exit dimension 127 for an opposite end of the first passage 114. As shown in FIGS. 5a and 5b, the entry and exit dimensions are different, such that the first passage 114 tapers in width from a first exterior face 106 of the splice holder to a second exterior face 107 of the splice holder 100. As noted in the figures, an opposite orientation is also disclosed such that a passage tapers from a wider end beginning at an opposite exterior face 107 toward a narrower end terminating at the other exterior face 106.

In the embodiment of the splice holder shown FIGS. 4, 5a, and 5b, the splice holder 100 incorporates the tapered, or conical, passages 114, 116 in a way that the orientation of the passages alternates. The alternating orientation results in passages that are laterally adjacent having oppositely sized entry dimensions 126 and oppositely sized exit dimensions 127 positioned side-by-side at one of the exterior faces 106, 107 of the splice holder.

Figure 6:
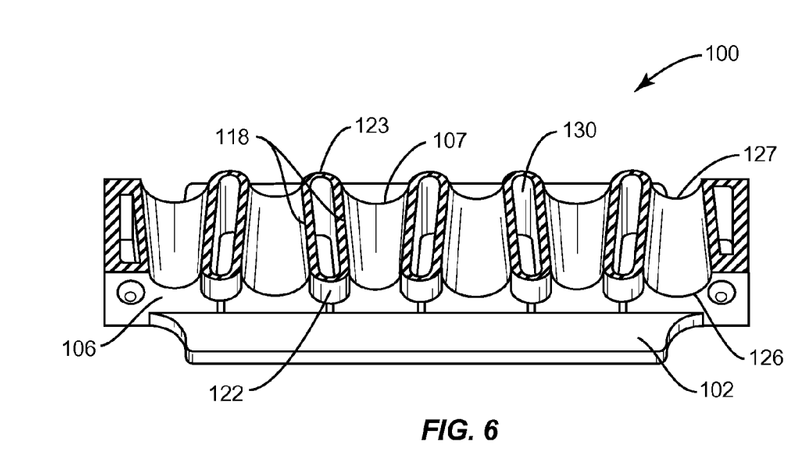
FIG. 6 illustrates perspective view of a horizontal cross section of the fiber optic splice holder of FIG. 4.
Figure 7:
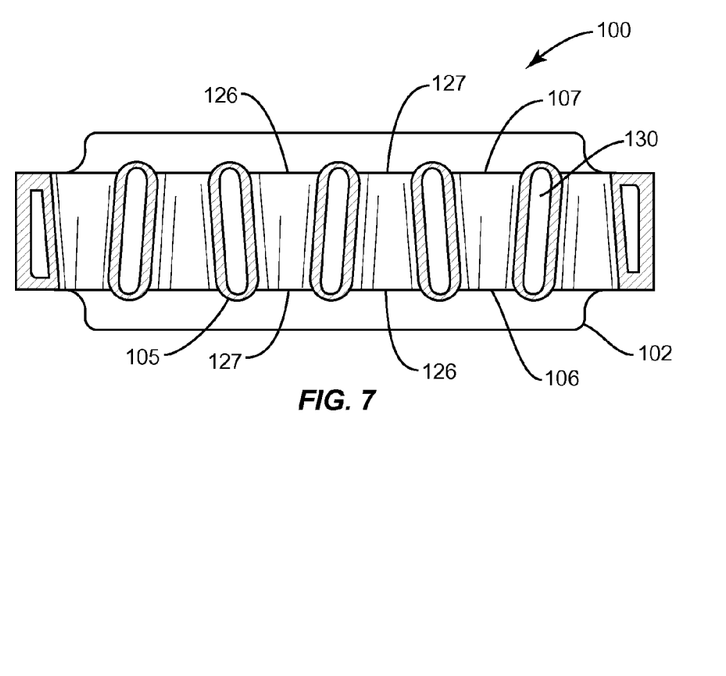
FIG. 7 illustrates a top plan view of the horizontal cross section of FIG. 6.
Figure 8:
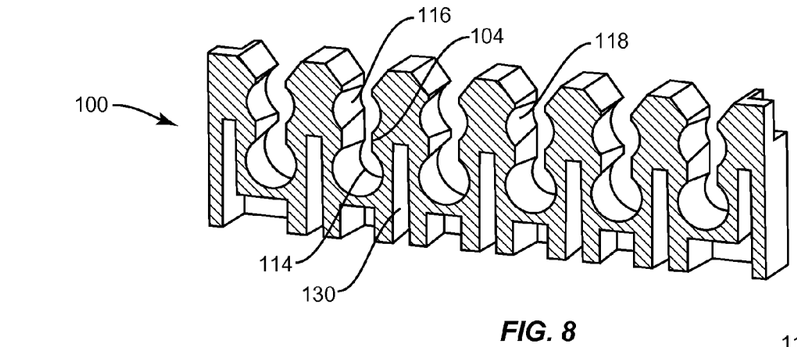
FIG. 8 illustrates a front perspective view of a vertical cross section of the fiber optic splice holder of FIG. 4.
Figure 9:
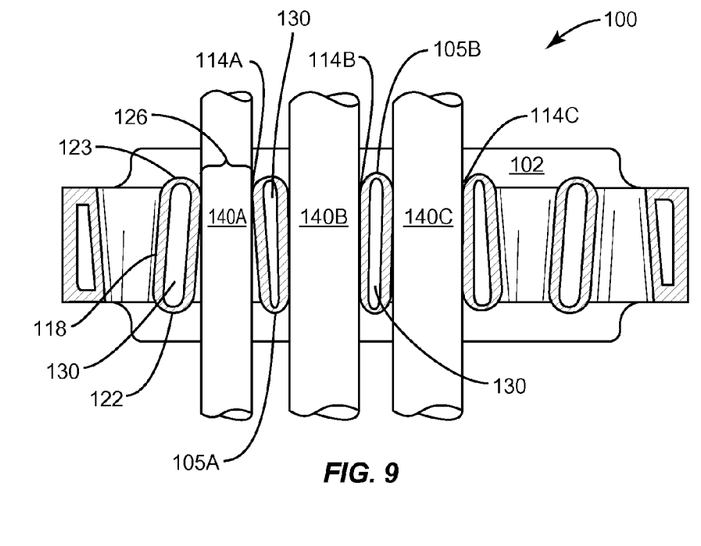
FIG. 9 illustrates a top plan view of a fiber optic splice holder disclosed herein having fiber optic splices extending through slots in the holder.

In some embodiments, as shown in the cross-sectional views seen in FIGS. 6, 7 and 8, the members 105 of the splice holder 100 define an internal cavity 130 that extends from the base 102 to a position alongside the first concave groove 112 of a member 105. The internal cavity 130 provides members 105 with flexibility to accommodate large fiber splices 140 and secure each fiber splice therein. The internal cavity 130 extends longitudinally through at least a majority of the respective member 105 and terminates proximate the exterior faces 106, 107 at end walls 122, 123. In other words, the internal cavity 130 extends longitudinally through the member 105 between end walls 122, 123 and laterally across the member 105 between internal sidewalls 118, wherein the end walls 122,123 are thinner than the internal sidewalls 118. Thinning the end walls 122, 123 adds another region of the member 105 that is sufficiently flexible to accommodate larger fiber splices within the slots 108 between members 105 (i.e., the fiber splices 140 may have sufficiently large cross sections that the members 105 must be deformable along internal sidewalls 118, and the internal cavity 130 along with end walls 122, 123 allow such flexibility).

The end walls 122, 123 define respective bubbles 120 that add to the flexibility of the members 105 and therefore provide additional functionality in securing large fiber splices 140 that displace a portion of the members 105 securing the fiber splices within the splice holder 100. The end wall incorporates a respective bubble, or bubble shaped protrusion from an exterior face, to provide even more flexibility to receive varying sizes of fiber splices. As noted above, the bubble formation along the end walls 122, 123 works in tandem with the internal cavity 130 and the end walls 122, 123 to increase the different sizes of fiber splices that a single fiber splice holder may retain. The bubble formation simultaneously works in tandem with the internal cavity 130 to minimize the forces that might otherwise cause members 105 to lean, relative to their normal, unloaded position. It will be appreciated that excessive leaning of these members could result in too loose a fit for splices placed in the top positions of the splice holder.

As noted above, the end walls 122, 123 are thinner than the remaining sections of the members 105 and are particularly thinner than the internal sidewalls 118. The term thinner in this context generally describes the dimension of the end walls as measured from the internal cavity 130 to an exterior face of the holder 106, 107 and is compared to a corresponding dimension of the sidewalls 118 measured from the internal cavity 130 to a concave groove 110, 112 on a member. In some embodiments, the thickness of the end walls 122, 123 is about one-half the thickness of the sidewalls 118, or less.

FIG. 7 illustrates that in one embodiment, the internal cavity 130 extends through a member 105 alongside the first passage 114 positioned between the splice holder base 102 and the second passage 116. Due to the conical, or tapered, shape of the passages, the internal cavity 130 shown in FIGS. 6 and 7 extends at an angle between the exterior faces 106, 107 of the member such that said internal cavity 130 is substantially parallel to the grooves 110 forming the first passage 114.

FIG. 8 shows a center cross section of the fiber splice holder 100 and illustrates that the internal cavity 130 may extend all the way from the splice holder base 102 to a point near the ridge 104. The internal cavity 130 generally lies within a member 105 adjacent a first passage 114. The internal cavity assists in securing fiber splices 140 within the passages 114, 116 by allowing members 105 to flexibly engage fiber splice 140. As shown if FIG. 9, large cross section fiber splices 140B, 140C displace portions of the member 105B for a secure fit within passages 114B 114C. A small cross section fiber splice 140A fits within a smaller dimensioned end (i.e., entry dimension 126) of a passage 114A without pressing the member 105A, yet the passage 114A still retains the smaller cross section fiber splice 140A in the same fiber splice holder that accommodates the larger fiber splices 140B, 140C.

Figure 10:
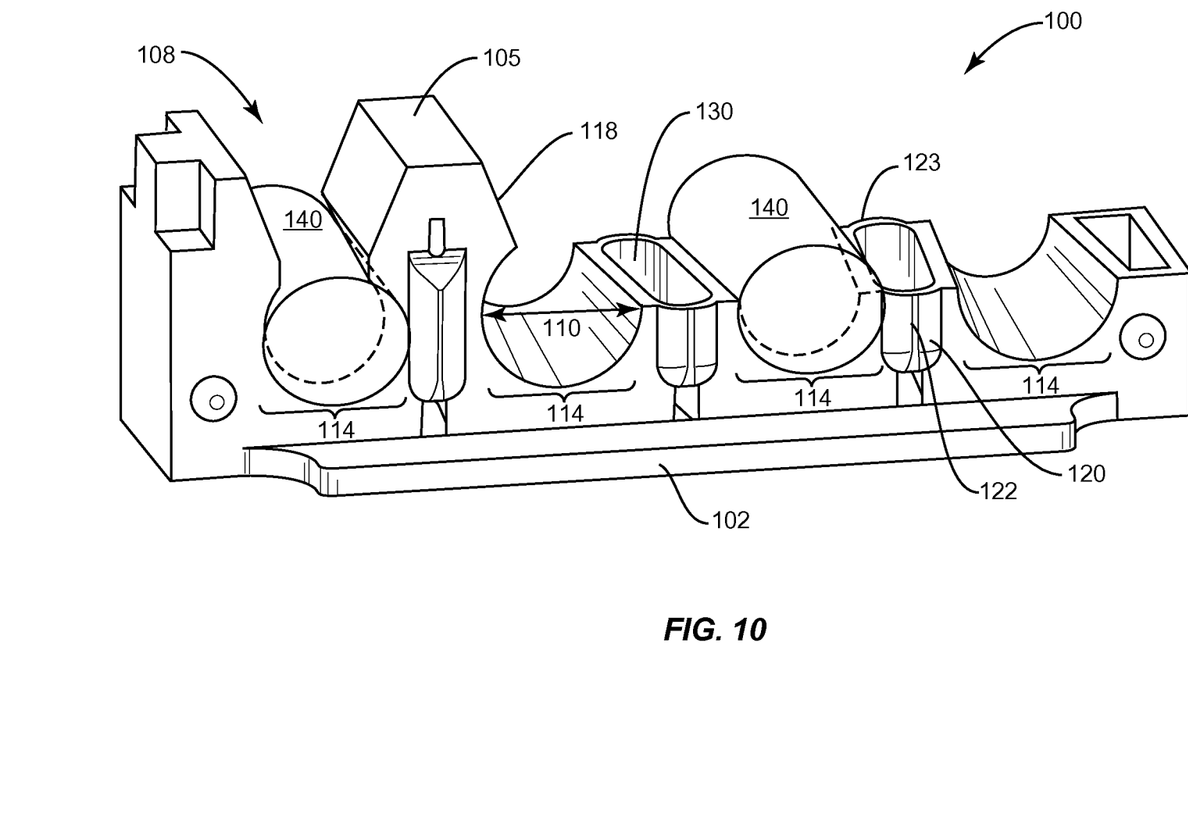
FIG. 10 illustrates a perspective view of a fiber optic splice holder having one row of passages for holding fiber optic splices therein.
Figure 11:
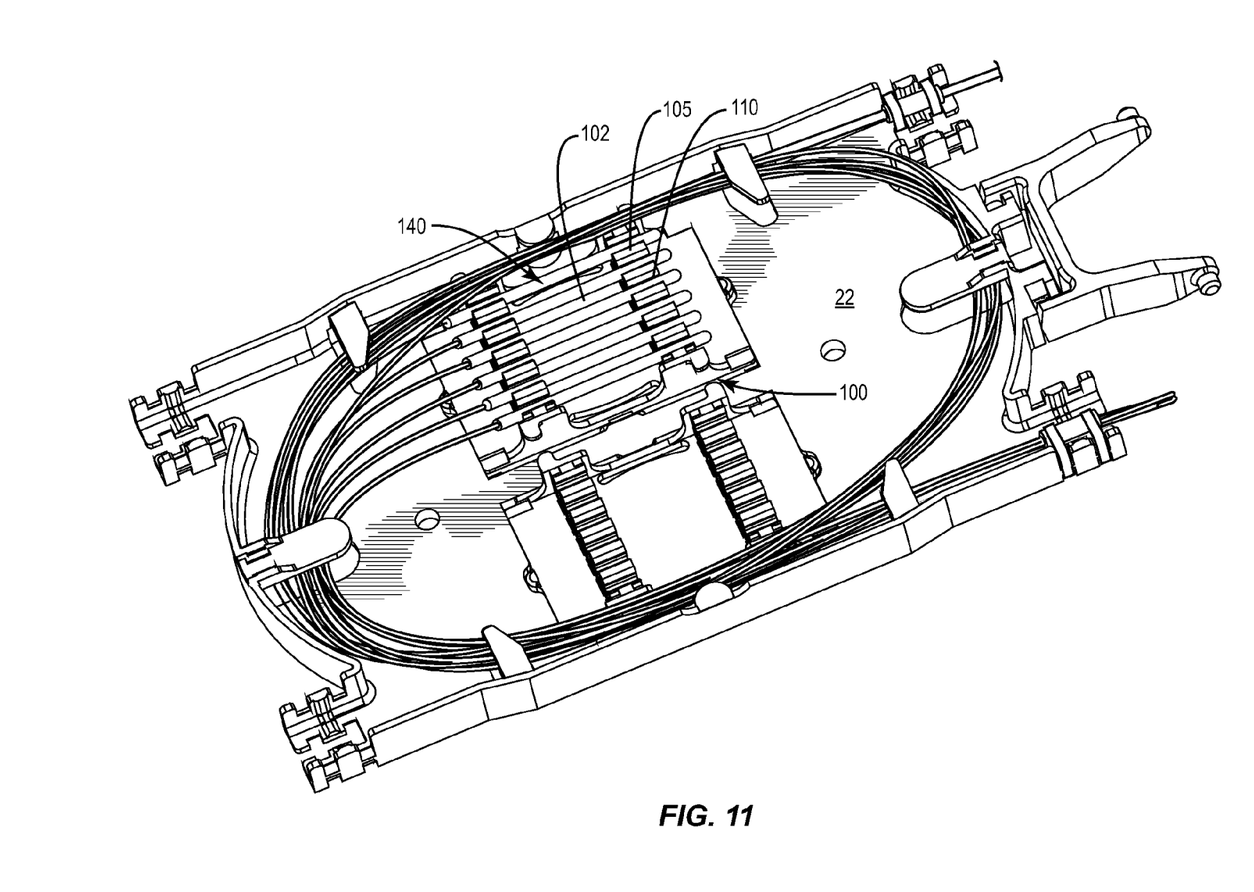
FIG. 11 illustrates a plurality of fiber optic splices held within numerous fiber optic splice holders as disclosed herein and positioned within a fiber tray.

FIG. 10 illustrates that the fiber splice holder described herein may include only one row of passages for accommodating fewer but larger fiber splices such as those used for mass fusion splices. FIG. 11 illustrates the fiber splice holder in use with the tray described above.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A splice holder for supporting fiber optic splices, the splice holder comprising:
   a splice holder base; and
   a plurality of parallel spaced apart members extending from the splice holder base to define a plurality of slots there between;
   wherein each of the plurality of parallel spaced apart members includes on at least one side a first concave groove proximate to the splice holder base and a second concave groove spaced away from the splice holder base, the concave grooves being separated by a ridge that is axially aligned with the grooves;
   wherein each of the plurality of slots includes a first passage defined by opposing first concave grooves and a second passage defined by opposing second concave grooves, each of said passages being sized to receive a fiber optic splice; and
   wherein each of two or more of the plurality of parallel spaced apart members also includes:
   a first relief passage passing through the member and adjacent to the first concave groove; and
   a second relief passage passing through the member and adjacent to the second concave groove, each of the relief passages being axially aligned with the grooves, each of the relief passages permitting expansion of its adjacent first or second passage via lateral deformation of its respective adjacent first or second concave groove.

2. A splice holder for supporting fiber optic splices, the splice holder comprising:
   a splice holder base; and
   a plurality of parallel spaced apart members extending from the splice holder base to define a plurality of slots there between;
   wherein each of the plurality of parallel spaced apart members includes on at least one side a first concave groove proximate to the splice holder base and a second concave groove spaced away from the splice holder base, the concave grooves being separated by a ridge that is axially aligned with the grooves;
   wherein each of the plurality of slots includes a first passage defined by opposing first concave grooves and a second passage defined by opposing second concave grooves, each of said passages being sized to receive a fiber optic splice; and
   wherein each of two or more of the plurality of parallel spaced apart members of the splice holder also includes:
   an internal cavity adjacent the first concave groove and extending longitudinally through at least a majority of the member, the internal cavity extending longitudinally through the member between end walls and laterally across the member between internal sidewalls, wherein the end walls are thinner than the internal sidewalls.

3. The splice holder of claim 2, wherein said end walls define a bubble protruding from a one of the parallel spaced apart members that is adjacent said first passage.

4. A splice holder for supporting fiber optic splices, the splice holder comprising:
   a splice holder base; and
   a plurality of parallel spaced apart members extending from the splice holder base to define a plurality of slots there between;
   wherein each of the plurality of parallel spaced apart members includes on at least one side a first concave groove proximate to the splice holder base and a second concave groove spaced away from the splice holder base, the concave grooves being separated by a ridge that is axially aligned with the grooves;
   wherein each of the plurality of slots includes a first passage defined by opposing first concave grooves and a second passage defined by opposing second concave grooves, each of said passages being sized to receive a fiber optic splice; and
   wherein each of one or more of the first passages are conically shaped.

5. The splice holder of claim 4, wherein two or more adjacent first passages are conically shaped with alternating orientations.

6. A splice holder for supporting fiber optic splices, the splice holder comprising:
   a splice holder base; and
   a plurality of parallel spaced apart members extending from the splice holder base to define a plurality of slots there between;
   wherein each of the plurality of parallel spaced apart members includes on at least one side a first concave groove proximate to the splice holder base, so that each of the plurality of slots includes a first passage defined by opposing first concave grooves, said passage being sized to receive a fiber optic splice; and wherein each of two or more of the plurality of parallel spaced apart members of the splice holder also includes an internal cavity adjacent the first concave groove and extending longitudinally through at least a majority of the member;
   wherein the internal cavity in each of the two or more of the plurality of parallel spaced apart members that includes the internal cavity extends longitudinally through the respective member between end walls and laterally across the respective member between internal side walls, wherein the end walls are thinner than the internal side walls.

7. The splice holder of claim 6, wherein said end walls define a bubble protruding from the respective member adjacent said first passage.

8. The splice holder of claim 6, wherein each of one or more of the first passages are conically shaped.

9. The splice holder of claim 6, wherein two or more adjacent first passages are conically shaped with alternating orientations.

10. The splice holder of claim 6, wherein each of the plurality of parallel spaced apart members further comprises a second concave groove spaced away from the splice holder base such that said first concave groove is between said splice holder base and said second concave groove, and wherein each of the plurality of slots includes a first passage defined by opposing first concave grooves and a second passage defined by opposing second concave grooves, each of said passages being sized to receive a fiber optic splice.

11. The splice holder of claim 10, wherein each of the plurality of parallel spaced apart members further comprises a ridge separating the first and second concave grooves.

12. A splice holder for retaining fiber optic splices, the splice holder comprising:
 a splice holder base; and
 a plurality of parallel spaced apart members, each member extending from the splice holder base and defining slots therebetween, said members defining at least a first concave groove on at least one side of each member, wherein opposing first concave grooves define a first passage within a slot, said passage sized to receive a fiber optic splice therein,
 wherein said passage defines an entry dimension for one end of the first passage and an exit dimension for an opposite end of the first passage, and wherein said entry and exit dimensions are different, such that said first passage tapers in width from a first exterior face of the splice holder to a second exterior face of the splice holder; and
 wherein each of two or more of the plurality of parallel spaced apart members of the splice holder also includes an internal cavity adjacent the first concave groove and extending longitudinally between end walls of the respective member.

13. The splice holder according to claim 12, wherein each of said end walls defines a bubble protruding from first and second exterior faces of the respective member.

14. The splice holder of claim 12, wherein each of the two or more of the plurality of parallel spaced apart members further comprises a second concave groove on at least one side, said second concave groove being spaced apart from said base such that said first concave groove is between said second concave groove and said base, and wherein opposing second concave grooves define a second passage within the slot.

15. The splice holder of claim 14, wherein the internal cavity extends alongside said first passage.

16. The splice holder of claim 15, wherein the internal cavity extends at an angle between said faces of the splice holder such that said internal cavity is substantially parallel to the grooves forming said first passage.

17. The splice holder of claim 14, wherein each of the two or more of the plurality of parallel spaced apart members further comprises a ridge separating said first and second passages.

18. The splice holder of claim 17, wherein the internal cavity extends between said splice holder base and said ridge.

\* \* \* \* \*